United States Patent [19]

Wessel et al.

[11] 4,244,823

[45] Jan. 13, 1981

[54] CENTRIFUGAL BASKET VALVE MECHANISM

[75] Inventors: Francis H. Wessel, North Bend; Matthew F. Kluesener, Cincinnati; Donald L. Hurley; Joseph B. Bange, both of Hamilton, all of Ohio

[73] Assignee: The Western States Machine Company, Hamilton, Ohio

[21] Appl. No.: 934,477

[22] Filed: Aug. 17, 1978

[51] Int. Cl.[2] ........................ B01D 33/06; B01D 33/36

[52] U.S. Cl. ................................ 210/371; 233/20 R; 233/46

[58] Field of Search ........................ 210/369, 371-373; 233/20 R, 46

[56] References Cited

U.S. PATENT DOCUMENTS

| | | | |
|---|---|---|---|
| 1,588,014 | 6/1926 | Davis | 210/371 |
| 1,866,499 | 7/1932 | Herr | 210/371 X |
| 1,903,298 | 4/1933 | Roberts | 210/371 X |
| 1,905,306 | 4/1933 | Roberts | 210/371 X |
| 1,909,188 | 5/1933 | Roberts | 210/371 X |
| 1,940,812 | 12/1933 | Roberts | 210/371 X |
| 2,694,494 | 11/1954 | Hertrich | 210/371 |

*Primary Examiner*—William A. Cuchlinski, Jr.

*Attorney, Agent, or Firm*—Albert C. Johnston; Ronald A. Clayton

[57] ABSTRACT

A centrifugal apparatus includes a centrifugal basket having a supporting base structure spaced below its bottom wall and fixed to the lower end of a vertical spindle to rotate the basket inside a casing surrounding the basket. The bottom wall of the basket has an opening therein about the spindle for discharge of centrifuged solids downwardly and then radially outwardly through the space between the base structure and the bottom wall. A basket valve member surrounds the spindle and is movable axially relative thereto between a position closing the basket opening and an open position spaced below the opening. A sleeve surrounds the spindle and is joined at its lower end with the valve member to position the valve member in its closed and open positions and further has an outwardly open annular channel at its upper end. A device for operating the valve includes a forked lever fulcrummed at one side of the spindle having arms straddling the spindle, each carrying on its end a roller confined in the channel. A motive device is mounted to the one side of the spindle for displacing the lever and thereby moving the sleeve axially so as to dispose the valve member in either of its positions.

7 Claims, 6 Drawing Figures

CENTRIFUGAL BASKET VALVE MECHANISM

The present invention relates to an improved basket and bottom valve mechanism for heavy cyclical centrifugal machines of the type used to separate liquid from solids in large scale industrial processes. Such machines have particular application in the manufacture, refining and drying of sugar, dextrose, and other crystalline or granular materials.

Centrifugal machines of this type typically include a large rotary cylindrical basket formed with an outlet or opening in its bottom wall. Liquid is centrifugally separated from solids in the basket when it is rotated at high speed, the liquid passing through the cylindrical basket wall leaving the solid material caked against the interior of the wall to be removed by a discharger shoe and discharged through the bottom outlet.

When the basket loaded with material to be centrifuged is rotated at high centrifuging speed to separate liquids from solids, the bottom outlet is closed by a valve member or cover. Mechanical devices for opening and closing the bottom valve in a centrifugal machine basket have been proposed. For example, U.S. Pat. No. 2,694,494 (Hertrich) discloses a basket valve mechanism that includes a conical valve member which is normally closed over the bottom outlet but is simultaneously liftable and tiltable to expose a part of the outlet. The valve is operated by a device that extends into the basket and includes a lifting arm which engages the underside of an outwardly extending flange formed at the top of the basket valve. The arm operates to tilt the valve inward within the basket to expose the outlet.

The principal object of the present invention is to provide another and improved form of basket valve mechanism for a heavy centrifugal machine, that may be automatically actuated in a safe and reliable manner to open the bottom outlet of the basket without damage to the valve.

It is a further object of the present invention to firmly support a bottom valve member in a centrifugal basket in both its open and closed positions to minimize damage to the valve member during operation of the centrifugal machine.

It is still a further object of the present invention to provide a bottom valve member and a valve actuating device that are compact, efficient and include principal elements mounted inside the centrifugal basket but which do not interfere with or obstruct the centrifuging action, the discharging action or other operations performed in the centrifuging basket.

Another object of the invention is to provide a basket valve member that rotates with the basket and is linked to the stationary actuating mechanism in a manner that prevents wear of either component.

Accordingly, the objections to certain prior art apparatus, based on the hazards which they present and the burdens and inefficiencies inherent in their operation, are avoided by the present invention.

In its preferred embodiment, the basket valve mechanism of the present invention is designed for use in a heavy cyclical centrifugal machine that includes a fixed support, a cylindrical basket having a bottom outlet in its bottom wall for discharge of solids such as those described, a vertically arranged spindle suspended in the support, that at its bottom end carries the basket for rotation, and a rotary prime mover mounted on the support and operative on the spindle to bring the basket to high centrifuging speed.

The basket has a supporting base structure spaced below its bottom wall fixed to the lower end of the spindle. The bottom valve mechanism, which controls discharge of centrifuged solids downwardly through the outlet and then radially outwardly through the space between the base structure and the bottom basket wall, comprises a bottom valve member surrounding the spindle and movable axially thereto between a normally closed position covering the outlet and an open position spaced below and exposing the outlet. A sleeve positions the valve member, being joined at its lower end thereto, and surrounds the spindle. The sleeve has an outwardly open annular channel on its upper end. A valve operating device is mounted in fixed location and includes a forked lever fulcrummed at one side of the spindle and having a pair of arms straddling the spindle, each of which carries a follower roller that projects inwardly into and is confined in the annular channel. A pressurized-fluid operated piston and cylinder device is mounted at the one side of the spindle to displace the lever thereby moving the sleeve axially to displace the valve member to either of its positions. The sleeve, annular channel and basket valve member assembly are all firmly mounted on the spindle to minimize damage to them during operation.

Further, the configuration of the sleeve and annular channel as well as the follower rollers on the forked lever permit the valve member to rotate with the spindle and basket with minimal wear to the respective elements.

In the preferred embodiment, means in the form of a compressed spring are provided to urge the valve member to the closed position and normally to hold it there.

It will be appreciated, then, and further from the detailed description provided below, that the basket valve mechanism of the present invention supports the basket valve member firmly in the basket to prevent damage. Further, the valve operating mechanism is compact so as not to interfere with other operations of the centrifugal machine, yet is efficient and reliable.

Other objects, features and advantages of the invention will be pointed out in or will be understood from the following detailed description and the accompanying drawings of the preferred illustrative embodiment described below.

Figure 1:
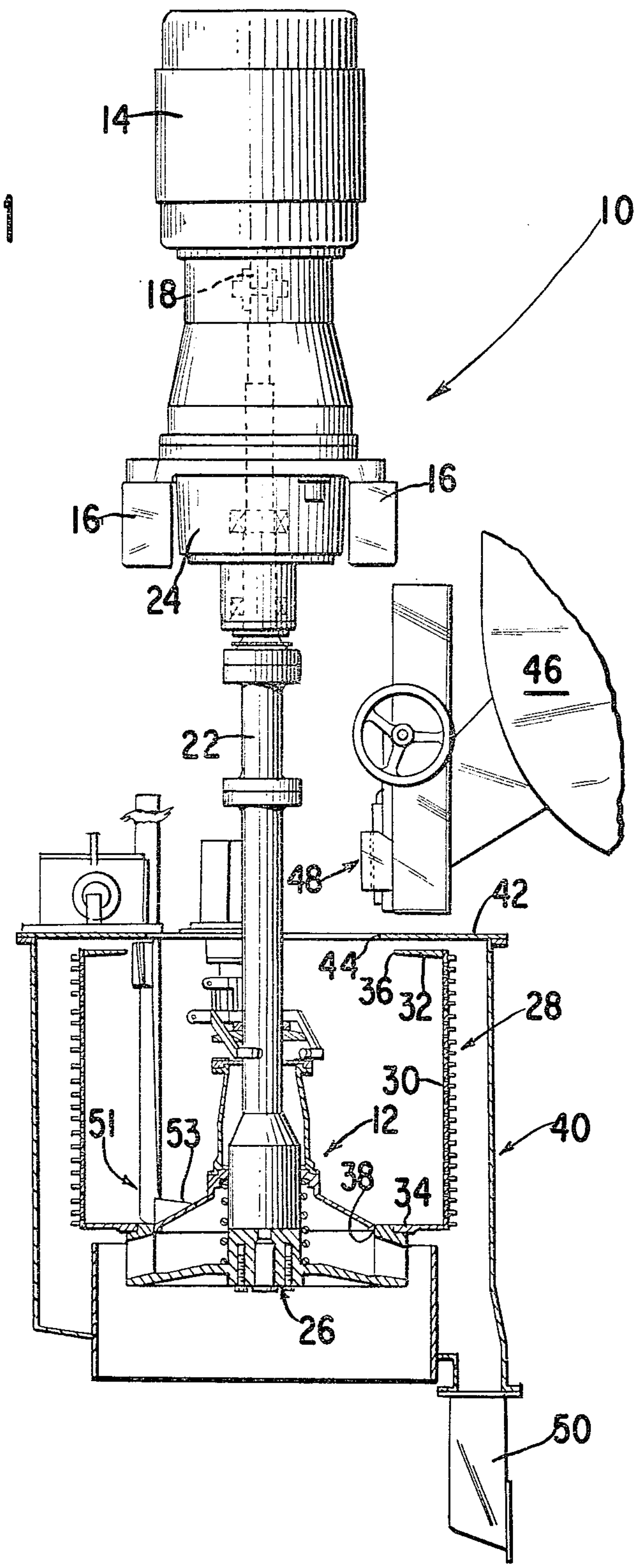
FIG. 1 is a side elevational view, partly in vertical cross-section to show internal detail, illustrating a centrifugal machine in which the basket valve mechanism of the present invention is installed.

FIG. 1 illustrates a heavy cyclical centrifugal machine, generally indicated at 10, that incorporates the basket valve mechanism of the present invention, generally indicated at 12. As can be seen, the centrifugal machine includes a prime mover in the form of a large electric motor 14 that is mounted on a fixed support 16, only part of which is shown in the interest of clarity. The shaft 18 of motor 14 is connected to a spindle 22 that is vertically suspended for gyratory motion in a suitable head 24 mounted in the support 16.

At its bottom end 26, the spindle 22 carries a large centrifugal basket 28 in a manner to be described in greater detail below. The basket has a perforated cylindrical side wall 30, which is lined with a screen, a cap 32 and a bottom wall 34. The cap is open at 36 and the bottom wall defines a central circular opening generally indicated at 38. The opening and closing of opening 38 is controlled by the basket valve mechanism 12.

The entire basket is surrounded by a stationary cylindrical curb or casing 40, also mounted in fixed position, having a top 42 defining a central opening 44. Flow of material to be centrifuged into the basket 30, through openings 44 and 36 from a holding tank 46, is controlled by a loading gate 48.

Figure 4:
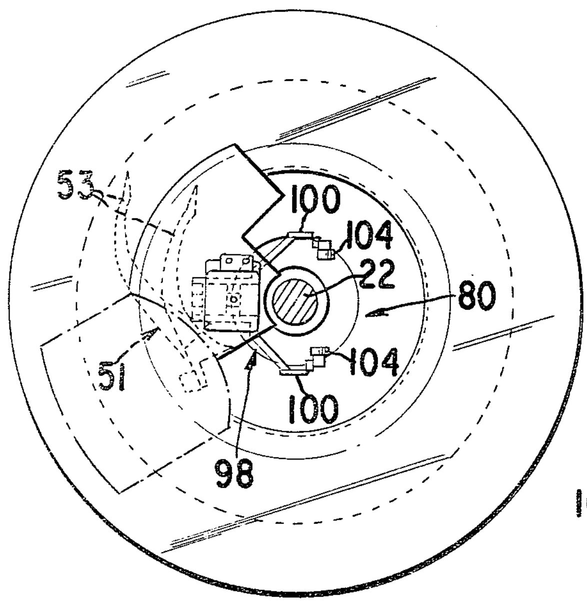
FIG. 4 is a schematic cross-sectional view taken through plane 4—4 in FIG. 2 showing the valve operating mechanism for the basket valve of the present invention in relation to a discharger shoe for removing solids from the cylindrical basket wall.

The basket 30 is rotated by the electric motor 14 at high centrifuging speed after being charged with material from the tank 46. The centrifuging operation causes liquid to pass through the perforated side wall 30 leaving a cylindrical solid charge thereagainst. The liquid is collected against the inner surface of the cylindrical casing 40 and channeled to a discharge passage 50. The solid charge is removed by a discharger mechanism 51 (FIG. 4) having a shoe 53 swingable toward the basket wall. When the basket is rotated to turn the charge against the shoe, the charge is scraped from the cylindrical basket wall and discharged through the opening 38 in a manner to be described in greater detail below.

Figure 2:
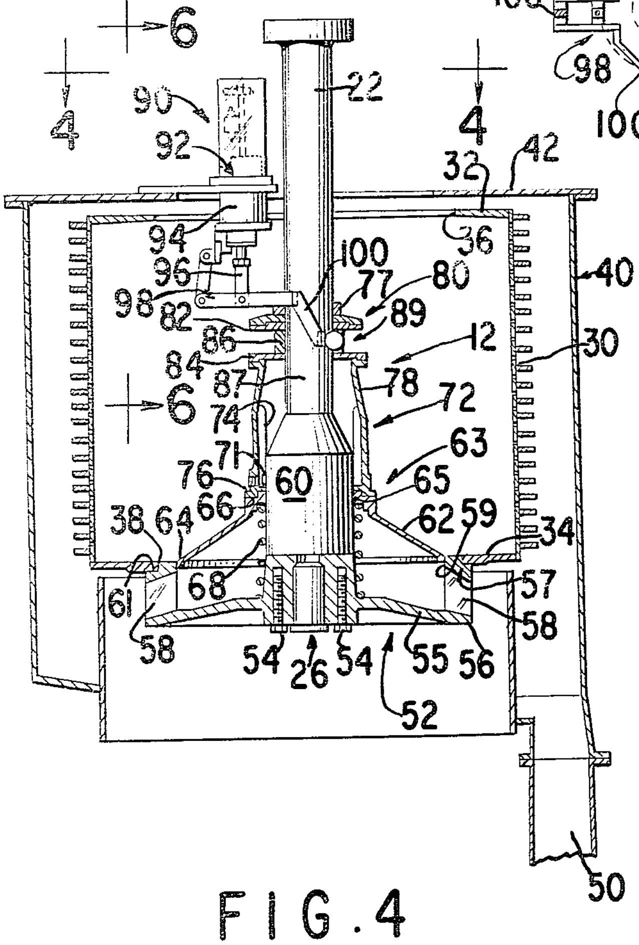
FIG. 2 is an enlarged vertical cross-sectional view of the basket and basket valve mechanism showing the basket valve in its closed position.
Figure 3:
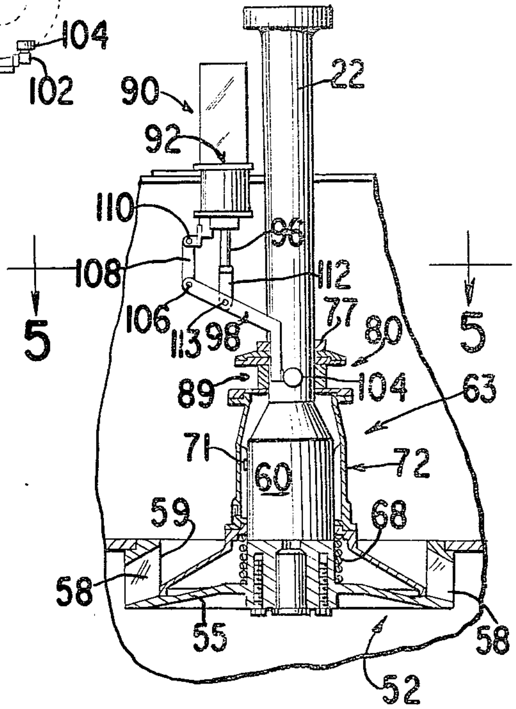
FIG. 3 is a partial vertical cross-sectional view similar to that shown in FIG. 2 illustrating the basket valve in its open position.

Referring now to FIGS. 2 and 3, in accordance with the present invention, a supporting base structure 52 having a generally conical, radially outwardly extending flange 55 is secured to the lower end 26 of the spindle 22 by any suitable means such as bolts 54. At its periphery 56, the base flange 55 is formed with a plurality of vertically upstanding, circumferentially spaced struts 58, the upper ends of which support a ring structure 57 that defines the outer circumferences of a discharge outlet 59. At its outer edge the ring structure 57 is formed with an outwardly facing annular rabbet 61. The edge of the bottom basket wall 34 adjacent the periphery of the opening 38 therein is received in and supported by the rabbet, thus, to support the entire basket on the supporting structure 52 with the base flange 55 spaced below the bottom wall 34 of the basket.

The spindle 22 is further formed in the region of its bottom end 26 with a portion 60 having an enlarged diameter. The basket valve mechanism 12 of the invention comprises a valve assembly 63 having a frusto-conical valve member 62 formed with a bearing portion 65 at its upper end portion to make a sliding fit with this enlarged diameter portion 60 of the spindle. On the interior of the bearing portion 65, the valve member 62 is formed with an annular rabbet 66. A yieldable device comprising coil spring 88 is mounted in coaxial relation about the large diameter portion 60 of the spindle 22 and is compressed between the downwardly facing surface of the rabbet 66 and the upwardly facing surface of the base flange 55 to urge the valve member constantly toward its closed position illustrated in FIG. 2.

At its base 64, the valve member has a diameter sufficient to close the basket bottom outlet 59. In the preferred embodiment, about 1/32 inch diameter clearance is provided between the base 64 of the valve member 62 and the border of the outlet 59.

As shown in FIG. 3, the basket valve assembly 63 may be depressed against the force of the spring 68 to an open position in which its base abuts the upper surface of the base flange 55. In this position, the valve member exposes the outlet 59 to permit solids to be discharged downwardly therethrough and radially outwardly between adjacent struts 58 of the base flange 55.

The basket valve assembly also includes a cylindrical sleeve 72 having a plurality of radially inwardly directed, vertically extending ribs 74, the inner edges of which are diametrically spaced by a distance sufficient to make a sliding fit with the exterior of the enlarged diameter spindle portion 60. The sleeve 72 is secured at 76 by any suitable means to the valve member 62. Accordingly, the valve member is further supported for firm axial reciprocal movement and may be positioned by the sliding fit of the ribs in the sleeve 72. A radially protruding stop or lug 71 is secured to the spindle to ensure through contact with one of the ribs 74 that the valve assembly rotates with the spindle.

At its upper end, above the ribs 74, sleeve 72 is formed with a frusto-conical section 78 that is fixed to a flange assembly, generally indicated at 80, which comprises axially spaced upper and lower, radially outwardly extending flanges 82 and 84 respectively that are interconnected by a short tubular section 86 having an inside diameter making a sliding fit with a smaller diameter portion 87 of the spindle 22. This flange assembly defines an outwardly open annular channel 89. Further, a collar 77 is fixed to the spindle 22 at a location where this collar will be abutted by the upper end of the flange assembly to establish a definite upward position of the valve assembly when it is disposed in the closed position of the valve member 62.

Figure 5:
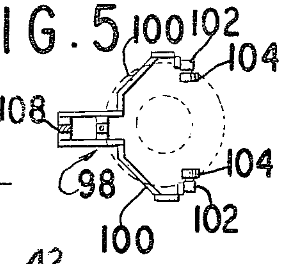
FIG. 5 is a horizontal cross-sectional view taken through plane 5—5 in FIG. 3.
Figure 6:
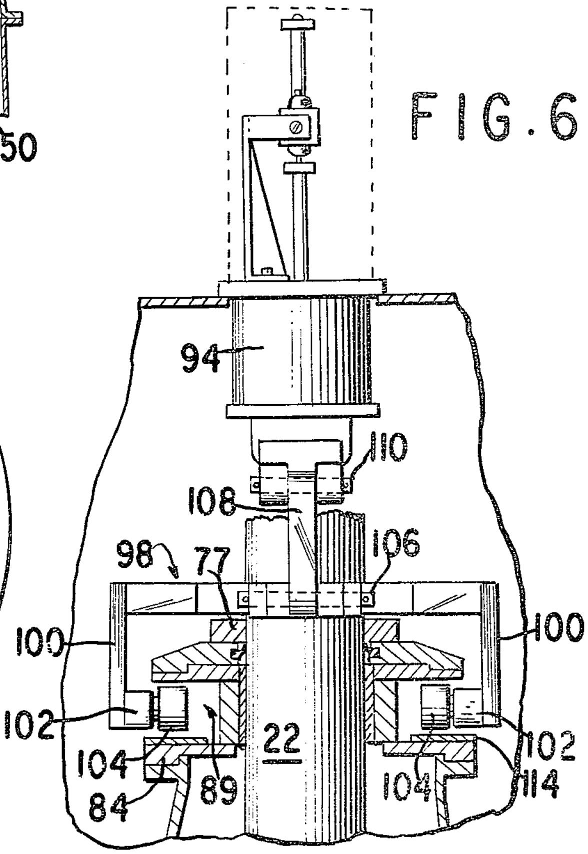
FIG. 6 is an enlarged vertical cross-sectional view taken through plane 6—6 in FIG. 2, showing the relationship of the follower rollers and the annular channel in detail.

The basket valve assembly is reciprocated between its closed position (FIG. 2) and its open (FIG. 3) position by a valve operating mechanism, generally indicated at 90, which comprises a fluid pressure responsive device 92 including a cylinder 94 mounted on a support fixed to the top 42 of the casing 40. The cylinder 94 extends through the basket top opening and into the space of the basket near one side of the spindle. A piston 96 is reciprocable vertically in the cylinder and is linked to a forked lever 98 shown in detail in FIGS. 2 through 6, having spaced arms 100 which, as shown in FIG. 6, diametrically straddle the flange assembly 80 and the spindle. Each arm 100 carries an inwardly projecting finger 102 that supports a follower roller 104 for rotation, confined within the annular channel 89 defined by the flange assembly. As can be seen in FIG. 6, the diameter of each follower roller 104 is smaller than the axial space between the upper and lower guide flanges. In the preferred embodiment, the clearance between the roller and the upper flange when the roller is in contact with the lower flange is $\frac{1}{4}$ inch.

At its end opposite the spaced arms, the forked lever 98 is fulcrummed through a pin 106 to a vertically arranged link 108 which is in turn connected through a pivot pin 110 to a bracket fixed to the housing of the cylinder 94. The piston 96 is connected through a clevis 112, having an adjustable length, to the forked lever by a pivot pin 113 at a location intermediate the lever ends. The clevis length may be adjusted to be sure that the follower rollers lie clear of the guide flanges as described above. Accordingly, when operated by pressurized fluid in the cylinder, the piston 96 is made to move downwardly, applying a downward force to the forked lever to move the follower rollers through an arcuate path from a location at the side of the spindle opposite that on which the cylinder is mounted (FIGS. 2 and 4) to a location substantially diametrical to the axis of the spindle (FIGS. 3 and 5). Through contact with a wear plate 114 on the lower guide flange 84, such movement of the forked lever and follower rollers forces the basket valve assembly 63 to its depressed or open position shown in FIG. 3. The release of downward fluid pressure in the cylinder is accompanied by the application of upward fluid pressure therein, causing the piston 96 to move axially upwardly with a resultant vertical lifting of the rollers 104 by lever 98 so that the rollers will bear against the upper flange of channel 89, initially acting upon the flange at a center line thereof, and thus will displace the valve member 62 directly toward its closed position. Aid is also given to the closing movement of the valve member 62 by the spring 68, which assures return of the basket valve assembly to its closed position against the stop collar 77 (FIG. 2).

It will be appreciated that the bearing portions 65 and 80 of the valve assembly hold this assembly, including the valve member 63, sleeve 72 and flange assembly 80, in a non-tilting position about the spindle 22. When the valve assembly is in closed position it rotates freely with the centrifugal basket, without any interference or frictional resistance by the forked lever and follower rollers or their motive mechanism; and these valve operating devices in turn do not interfere with the charge loading, charge washing and discharging operations which take place in the basket.

As can be seen in the drawings, the basket valve mechanism occupies relatively little of the basket space away from the spindle. The arrangement of the forked lever and its operating linkage extends in a limited region to one side only of the spindle, leaving unobstructed the spaces required for the inflow of charge material, for a charge washing device and for the required discharging mechanism. The valve operating mechanism assures the required positiveness and safety of the movements and positioning of the basket bottom valve, and the valve assembly is at all times firmly and safely supported for rotation with the basket.

Although a specific embodiment of the invention has been described and illustrated in the drawings, it is to be understood that this is for purposes of illustration and that modification may be made and other structural forms utilized in keeping with the invention which is intended to be defined by the appended claims.

What is claimed is:

1. In a centrifugal apparatus including a centrifugal basket having a supporting base structure spaced below its bottom wall and fixed to the lower end of a vertical spindle for rotation of the basket inside a casing surrounding the basket, said bottom wall having an opening therein about the spindle for discharge of centrifuged solids downwardly and then away through space between said base structure and said bottom wall, and a basket bottom valve member surrounding said spindle and movable axially relative thereto between a position closing said opening and an open position spaced below said opening, means for positioning said valve member comprising a sleeve surrounding said spindle and joined at its lower end with said valve member, said sleeve having an outwardly open annular channel on its upper end, and valve operating means including a forked lever fulcrummed at one side of said spindle and having arms straddling said spindle, said arms carrying on their ends rollers confined in said channel, and motive means mounted at said one side for displacing said lever and thereby moving said sleeve axially so as to dispose said valve member in either of its said positions.

2. Centrifugal apparatus according to claim 1, said lever being so fulcrummed and so connected with said motive means that upon displacement of said lever by said motive means said rollers are moved in an arcuate path between a location at a side of said spindle opposite to said one side and a location substantially diametrical to the axis of said spindle.

3. Centrifugal apparatus according to claim 1, further comprising a stop member on said spindle for limiting upward movement of said sleeve and yieldable means constantly urging said valve member upward so that said sleeve is held against said stop member to keep said valve member in a certain position closing said bottom opening when said valve member is not displaced by said motive means.

4. Centrifugal apparatus according to claim 3, said valve member being of frusto-conical form and having at its upper end a bearing portion slidable along a lower end portion of said spindle, said yieldable means comprising a coiled spring surrounding said lower end portion and compressed between said bearing portion and said base structure.

5. Centrifugal apparatus according to claim 3 or claim 4, said channel being formed by annular flanges extending radially from the upper end of said sleeve and spaced apart axially by a distance greater than the diameter of said rollers, said motive means being connected with said lever by coupling means the length of which is adjustable for setting said rollers so that they will lie clear of said flanges when said valve member is in said certain closed position.

6. Centrifugal apparatus according to claim 5, said motive means comprising a fluid pressure responsive device including a cylinder fixed to a support on the top of said casing and a piston reciprocable vertically in said cylinder, and a link pivoted at one end to an end of said lever and supported at its other end pivotably relative to said cylinder, said coupling means being connected to said piston and pivoted to said lever at a location between its said end and said arms.

7. Centrifugal apparatus according to claim 1, said spindle having a radially protruding stop element on a lower end portion thereof, said sleeve having fixed thereto along its inner side a vertically extending rib slidably engaged with said stop element to prevent movement of said valve member circumferentially relative to said spindle.

* * * * *

Disclaimer 4,244,823.—*Francis Henry Wessel;* North Bend, *Matthew F. Kluesener;* Cincinnati and *Donald Lee Hurley* and *Joseph Bernard Bange;* Hamilton, Ohio. CENTRIFUGAL BASKET VALVE MECHANISM. Patent dated Jan. 13, 1981. Disclaimer filed Mar. 16, 1981, by the assignee, *The Western States Machine Co.*

Hereby enters this disclaimer to claims 1, 3 and 4 of said patent.

[*Official Gazette May 26, 1981.*]